United States Patent [19]

Ohlson

[11] Patent Number: 4,527,347

[45] Date of Patent: Jul. 9, 1985

[54] FIXING MEANS FOR MOUNTING X-RAY FILMS

[75] Inventor: Carl E. Ohlson, Solna, Sweden

[73] Assignee: AO Medical Products AB, Stockholm, Sweden

[21] Appl. No.: 459,605

[22] PCT Filed: May 11, 1982

[86] PCT No.: PCT/SE82/00165

§ 371 Date: Jan. 12, 1983

§ 102(e) Date: Jan. 12, 1983

[87] PCT Pub. No.: WO82/04130

PCT Pub. Date: Nov. 25, 1982

[30] Foreign Application Priority Data

May 12, 1981 [SE] Sweden ................................ 8102987

[51] Int. Cl.³ .................................................. G09F 13/00
[52] U.S. Cl. .................................... 40/361; 40/617; 40/11 R
[58] Field of Search ............. 40/156, 617, 13, 124.4, 40/361, 11

[56] References Cited

U.S. PATENT DOCUMENTS

| | | | |
|---|---|---|---|
| 2,049,820 | 8/1936 | Myhre | 40/11 R |
| 2,530,821 | 11/1950 | Hubbell | 40/617 |
| 2,755,585 | 7/1956 | Lubow | 40/617 |
| 2,972,201 | 2/1961 | Niedermayer | 40/11 R |
| 3,552,702 | 1/1971 | Springer | 40/11 R |

Primary Examiner—Gene Mancene
Assistant Examiner—Wenceslao J. Contreras
Attorney, Agent, or Firm—Fleit, Jacobson, Cohn & Price

[57] ABSTRACT

A fixing means for detachably mounting X-ray films (1) or the like to an illuminated surface (2) of an X-ray examining cabinet (3) comprises a resilient member (4) made of rubber, plastics or the like and having an anchoring portion (4a), an engaging portion (4b) and an intermediate, thinner hinge means (4c). The resilient member (4) is accommodated in a profiled frame element having a lower support part (5b) which supports the engaging portion (4b) so that it forms a right angle or an acute angle with the anchoring portion (4a). The distance between the illuminated surface (2) of the examining cabinet and the surface (5a') of the profiled frame element (5) abutting the anchoring portion (4a) is such that when the engaging portion (4b) swings back against the X-ray film (1), under frictional engagement with the film through the pointed part (4b') of the engaging portion, the engaging portion (4b) is compressed, resulting in an increase in the elastic abutment pressure of the engaging portion against the X-ray film. This facilitates insertion of the X-ray film in position on the illuminated surface, while ensuring that the film is accurately positioned and reliably held at the same time.

7 Claims, 4 Drawing Figures

U.S. Patent           Jul. 9, 1985           4,527,347
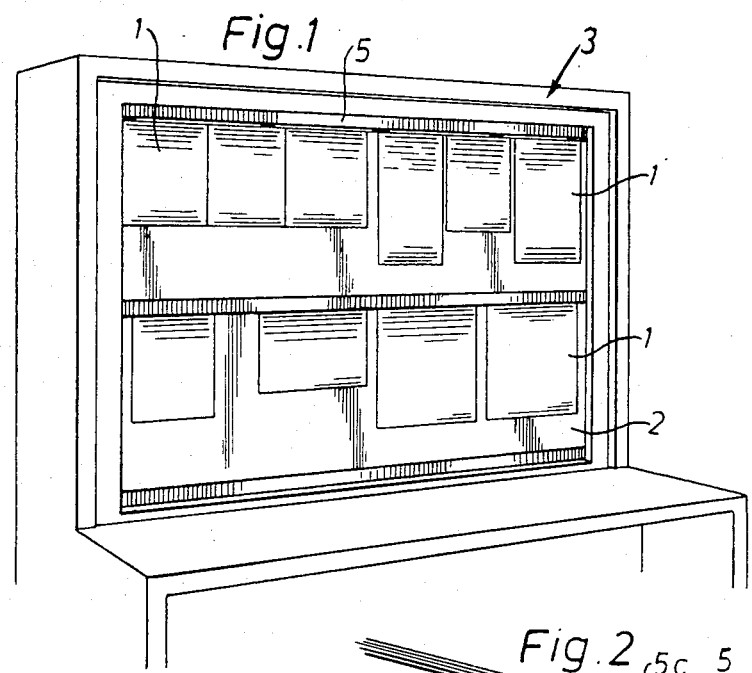
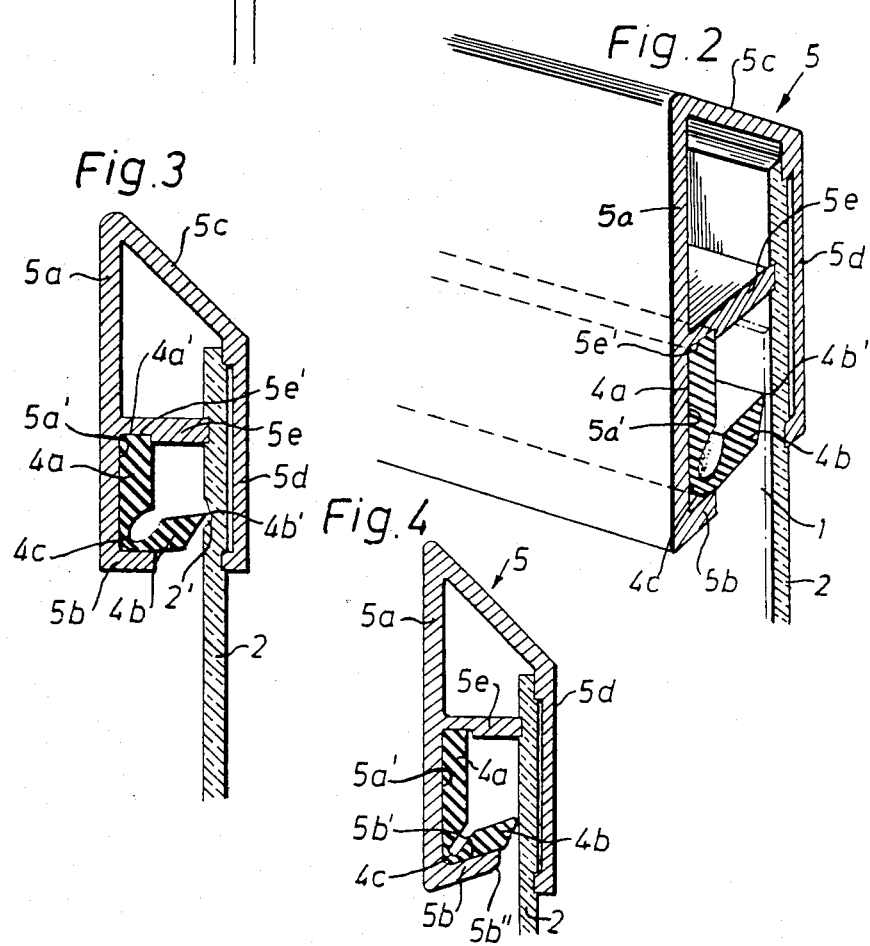

FIXING MEANS FOR MOUNTING X-RAY FILMS

TECHNICAL FIELD

The present invention relates to fixing means for mounting X-ray films, or like elements to an illuminated surface, of an X-ray examining cabinet in a readily detachable manner.

BACKGROUND ART

The Swedish Patent Specification Number 310 603 discloses a fixing means of the kind mentioned which comprises a resilient member made of rubber, plastics or the like and having an anchoring portion arranged to be received in a profiled frame element associated with the cabinet or with a separate film magazine, and a film-engaging portion which is arranged to be deflected, or pushed to one side, when an X-ray film is introduced between said surface and said film-engaging portion, and then released, so as to hold the film against the illuminated surface by friction.

One disadvantage with this known X-ray film fixing means is that the film-engaging portion must be capable of exerting a relatively high pressure against the illuminated surface, in order to hold the film satisfactorily. This means, however, that a correspondingly large force must be exerted in order to deflect the film-engaging portion when mounting the X-ray film in position. Consequently, in practice, the films are often not fixed to the illuminated surface satisfactorily, and as a result fall off and are liable to be damaged and hence render it difficult or impossible to make a diagnosis on the basis of the X-ray film in question.

Furthermore, X-ray films of the kind in question are often carried in vertically moveable film-supporting frames in a wheeled transport box which, similar to a carriage, can be moved between a storage station and one or more different X-ray examining cabinets, where the films are examined. During transportation of such a box or carriage, the box or carriage is subjected to vibrations and similar movements, and there is an undeniably high risk of a number of films loosening from their respective fixing means, which can cause chaos in the whole of the system arranged to enable accurate identification of the various X-ray images. If this situation arises, it is often necessary to re-take the X-ray films, with a subsequent increased dosage risk for the patients.

OBJECT OF THE INVENTION

It will readily be understood herefrom, with respect to the handling of X-ray pictures, that it is of the utmost importance, and highly desirable, that the films can be readily mounted on the illuminated surface, securely held in position thereon-possibly over long periods of time-and can readily be removed from said surface when so desired.

Hitherto known fixing means, for example fixing means according to the aforementioned Swedish Patent Specification, do not satisfy these requirements, and consequently an important object of the present invention is to provide a fixing means which eliminates the disadvantages inherent with previously known fixing means and which also fulfills the aforementioned requirements.

A further problem relating to the profiled frame element, which may comprise aluminium for example and which carries the resilient members of the fixing means, has a different coefficient of expansion than the illuminated surface, which may be made of plexiglass for example. This means that the distance between the film-engaging portion of the resilient member and the illuminated surface can vary independence upon the temperature in the room where the arrangement is located and/or how long the surface has been illuminated. It will be understood from this that further problems are experienced with respect to the reliability of the fixing means, since the force at which the film is pressed against the illuminated surface will vary correspondingly.

Consequently, a further object of the invention is to also eliminate this disadvantage encountered with known fixing means.

BRIEF DISCLOSURE OF THE INVENTION

A fixing means according to the invention which fulfills these objects is mainly characterized in that the engaging portion is supported so that it forms a right angle or an actute angle with the anchoring portion; that between the anchoring portion and the engaging portion there is provided a thinner hinge portion, which facilitates deflection or bending of the engaging portion when mounting the film; and in that the distance between the illuminated surface and the surface of the profiled frame element abutting the anchoring portion is such that when the engaging portion swings back against the X-ray film, with a pointed part of the anchoring portion in friction engagement with the X-ray film, the engaging portion becomes compressed, thereby to increase the elastic abutment pressure exerted by the engaging portion against the X-ray film.

Thus, an important feature of the invention is that the resilient member exhibits a hinge means of thinner material which, when held approximately at right angles to or obliquely upwardly towards the illuminated surface-can readily be deflected upwardly when the X-ray film is inserted, thus enabling the actual insertion of the X-ray film to be readily effected, without needing to overcome any appreciable force in order to bend the resilient element upwardly. When, however, the X-ray film is then released it will tend to be drawn downwardly by gravity, and as a result of the frictional engagement of the engaging portion with the X-ray film the engaging portion will tend to accompany this downwad movement of said film. As a result of the aforementioned distance relationship, however, this restoring movement of the engaging portion can only take place to a given limit before the engaging portion is compressed in its longitudinal direction, the extent to which said portion is compressed increasing with increasing tendency of the X-ray film to move downwardly.

This compression of the film-engaging portion immediately results in an increase in the elastic abutment pressure against the X-ray film, and hence the film will be reliably held in position against the illuminated surface.

In spite of this, no real difficulty will be experienced in removing the X-ray film, since a strong pull downwardly on the film results in such compression of the engaging member, with subsequent downward deflection thereof, as to cause the abutment pressure against the X-ray film to cease.

Thus, it is important that the X-ray film cannot move downwardly along the illuminated surface without the engaging portion being pressed, and that this compression, in turn, results in an increase in the force at which the engaging portion resiliently abuts the X-ray film.

As will be understood, despite its simplicity, a fixing means according to the invention eliminates the risk of mounted X-ray films being shaken loose, irrespective of whether the films are placed in a frame in a wheeled storage box which is subjected to vibrations and like shaking movements, for example when passing over thresholds, into and out of lifts etc.

Neither does the fact that the profiled frame element, which may comprise aluminium for example, and the illuminated surface, which may comprise plexiglass for example, have different coefficients of expansion have any affect on the efficiency of the fixing means, since any deviations in the distance between the illuminated surface and the surface of the profiled frame abutting the anchoring portion is compensated by the different extents to which the engaging portion of the resilient member is compressed.

In practice, it is preferred that the distance between the illuminated surface and the surface of the profiled frame abutting the anchoring portion is smaller than the length of the engaging portion measured from its pointed part to the surface of the hinge means abutting the anchoring portion. This will ensure that the engaging portion will always be compressed when urged to move downwardly under the influence of a mounted X-ray film.

In order to ensure that the engaging portion is readily and smoothly deflected when inserting an X-ray film in position, and also to ensure reliable compression of the engaging portion when said portion tends to move downwardly, the hinge means preferably exhibits a rounded, smooth bridging portion between the anchoring portion and the engaging portion.

This effect can be amplified when the bridging portion between the surface of the profiled frame abutting the anchoring portion and its surface forming a support for the hinge means is rounded. In this way, the actual pivot point is given the possibility of "wandering" along the thinner hinge means, independence upon the angle formed by the engaging portion with the illuminated surface, wherein it is ensured that a high abutment force is obtained when the engaging portion is compressed, even when the engaging portion is deflected to a comparatively large extent.

It has been found suitable in practice for the part of the profiled frame supporting the hinge means to extend almost to the illuminated surface and to exhibit a lower chamfer, which facilitates insertion of the X-ray film.

In this way, the engaging portion is provided with a satisfactory support, which facilitates its action in a desirable manner, while also facilitating fixing of the X-ray film. The chamfer at the lower part of the support surface will also guide the X-ray film to the position in which the engaging portion begins to engage the same.

This engagement of the X-ray film is improved when the engaging portion is provided with a pointed end, as in accordance with a preferred embodiment.

In this respect, it is possible to improve engagement of the X-ray film still further, by providing the illuminated surface with a recess in the region of the point of the engaging portion.

Mounting of the resilient member to the profiled frame element is facilitated when a horizontal part of the profiled frame element is provided with an elongate groove or recess arranged to accommodate the end part of the anchoring portion.

The resilient member, which suitably comprises an extruded, continuous strip element which extends along the whole of the frame profile, can herewith be mounted in position on the profiled frame element in a continuous operation. In a similar manner, the profiled frame element can also be fitted to the illuminated surface, which two operations can be independent of one another.

Even though the resilient member preferably comprises an extruded, continuous strip, it will be understood that said member may instead comprise a plurality of separate elements of shorter length arranged in mutually spaced relationship.

Exemplary embodiments of the invention will now be described with reference to the accompanying drawing.

BRIEF DESCRIPTION OF THE DRAWING

FIG. 1 is a perspective view of part of an X-ray examining cabinet provided with two film-carrying frames, each of which being alotted a fixing means according to the invention.

FIG. 2 is a perspective view of part of a profiled frame element of a film-carrying frame according to FIG. 1, the profiled frame element being mounted on an illuminated surface and provided with fixing means according to the invention.

FIG. 3 is a cross-sectional view of a fixing means which is slightly modified with respect to the fixing means of FIG. 2.

FIG. 4 is a cross-sectional view of a further modification.

In the figures, corresponding parts are identified by the same references.

DESCRIPTION OF PREFERRED EMBODIMENTS

An X-ray examining cabinet 3 is provided with two vertically moveable film-carrying frames 5, which are mounted onto an illuminated surface in the form of a sheet 2 of plexiglass, and provided with means for detachably carrying X-ray films 1 in front of the surface of the sheet 2 illuminated from within the cabinet.

A fixing means for the X-ray films 1 comprises a profiled frame element 5 having a rear vertical part 5a, a lower horizontal part 5b, an upper, downwardly and forwardly sloping part 5c, which merges into a straight vertical part 5d. Approximately centrally of the profiled frame element there is provided a horizontally extending part 5e having a downwardly facing, longitudinally extending recess 5e'.

The lower part 5b can be either substantially totally horizontal (FIGS. 2 and 3) or may slope slightly upwardly (FIG. 4) and is intended to form a support for a resilient member 4, made of rubber, plastics, or the like, which constitutes a fixing means for securing the X-ray films 1.

The resilient member 4 comprises three portions, namely an anchoring portion 4a, which in the position of use illustrated in FIGS. 2-4 is substantially vertical, a thinner hinge or pivot means 4c, and an engaging portion 4b having a pointed part 4b'. The engaging portion 4b is supported by the lower, horizontal or slightly upwardly sloping part 5b of the profiled frame element.

The upper edge 4a' of the anchoring portion 4a is accommodated in a longitudinally extending recess 5e' in the intermediate, horizontal part 5e of the frame element. The rear surface 4a' of the anchoring portion 4a is fixed, for example by means of an adhesive, to the inner surface 5a' of the vertically extending part 5a of the profiled frame element.

As will be seen from FIGS. 2-4, the engaging portion 4b of the resilient member 4 is supported so that said portion forms a right angle or an acute angle with the anchoring portion 4a. The distance between the illuminated surface 2 and the surface 5a of the profiled frame element 5 abutting the anchoring portion is such that a restoring movement of the engaging portion 4b, under frictional engagement of its pointed part 4b' with an inserted X-ray film 1 results in compression of the engaging portion 4b and in a corresponding increase in the elastic abutment pressure exerted against the X-ray film. An inserted X-ray film 1, which when inserted results in the engaging portion 4b of the resilient member 4 being deflected or bent upwardly, will in this way be held reliably and accurately secure as a result of the elastic abutment pressure exerted when the engaging portion is compressed in its length direction.

The distance between the illuminated surface 2 and the surface 5a of the frame element 5 abutting the anchoring portion is smaller than the length of the engaging portion measured from its point 4b' to the surface of the hinge means 4c abutting the anchoring portion.

To facilitate movement of the hinge means, it is provided with a smooth, rounded transition or bridging portion between the anchoring portion 4a and the engaging portion.

In the FIG. 4 embodiment, the bridging portion between the surface 5a' abutting the anchoring portion of the frame element 5 and the lower, slightly upwardly inclined surface 5b' of said element 5 is also rounded, said surface 5b' forming a support for said hinge means. In this way compression of the engaging portion 4b in its length direction is facilitated, and the actual pivot point is able to "wander" along said hinge means.

As will also be seen from FIG. 4, the lower profiled frame part 5b supporting said hinge means extends almost up to the illuminated surface 2, and is provided with a lower chamfer 5b'', which facilitates insertion of the X-ray film 1.

The end 4b' of the engaging portion 4b is pointed, which facilitates its engagement with the X-ray film. In the FIG. 3 embodiment, the point 4b' is arranged to co-act with a groove or shoulder 2' in the illuminated surface 2. This ensures that fastening of the X-ray film is further improved.

In all of the illustrated embodiments, the resilient member 4 comprises an extruded elongate strip of rubber or plastics. In certain cases, the major part of the resilient member may be made of plastics, in which there can be arranged a pointed part made of a material having higher friction characteristics, for example rubber. Alternatively, the resilient member 4 may comprise a plurality of short elements arranged in mutually spaced relationship.

The upper, inclined profiled frame part 5c ensures that the lower, loosely hanging part of the X-ray films 1 is guided into place when the frame elements are cuased to move vertically downwards to an underlying, optionally wheeled storage box, in which the X-ray films are stored when not beinbg examined with the aid of the X-ray examining cabinet.

The aforedescribed fixing means enables an X-ray film to be readily secured in position and to be gripped positively between the anchoring portion 4a and the illuminated surface 2. To remove the X-ray film, the lower part thereof is gripped and the film given a strong pull, which causes the engaging portion 4b to be deflected downwardly o an extent such that engagement of the pointed part 4b' with the X-ray film ceases. This operation can be made easier when the pulling force is exerted progressively, beginning from the region of one vertical side edge of the film.

A further advantage afforded by the invention is that the film can be inserted slowly-optionally by hand-without being bent. A similarly effective retention of an X-ray film when using conventional fixing means would present a much increased resistance to insertion of the film, thereby rendering insertion impossible.

I claim:

1. A fixing means for mounting X-ray films, or like elements, to an illuminated surface of an X-ray examining cabinet in a readily suitable manner, the fixing means comprising: an illuminated surface; a profiled frame element extending along said surface; a resilient member made of resilient material and having an anchoring portion received in the profiled frame element; a film-engaging portion including a pointed part which is arranged to be deflected when an X-ray film is introduced between said surface and said film-engaging portion and to hold said film against said illuminated surface by friction, the engaging portion supported so that it forms substantially a right angle with the anchoring portion; hinge means connecting the anchoring portion and the engaging portion to facilitate deflection of the engaging portion when the film is mounted, said hinge means being of reduced thickness relative to said anchoring portion and said film-engaging portion and including a rounded, smooth briding portion between the anchoring portion and the engaging portion; the distance between fhe illuminated surface and the surface of the profiled frame element abutting the anchoring portion being such that when the engaging portion swings back under the frictional engagement of its pointed part against the X-ray film the engaging portion is deflected away from said illuminated surface, resulting in an increase in the elastic abutment pressure exerted against the X-ray film.

2. A fixing means according to claim 1, wherein said profile frame element includes a lower part that extends toward the illuminated surface and the distance between the illuminated surface and the lower part of the profiled frame element is smaller than the length of the engaging portion measured from its pointed part to the surface of the thinner hinge means abutting the anchoring portion.

3. A fixing means according to claim 1, wherein the bridging portion between the surface of the profiled frame element abutting the anchoring portion and the lower part of the profiled frame part forming a support for the hinge means is rounded.

4. A fixing means according to claim 1, wherein the profiled frame part supporting the hinge means terminates short of the illuminated surface and includes a lower chamfer arranged to facilitate insertion of the X-ray film.

5. A fixing means for mounting X-ray films, or like elements, to an illuminated surface of an X-ray examining cabinet in a readily suitable manner, the fixing means comprising: an illuminated surface; a profiled frame element extending along said surface; a resilient member made of resilient material and having an anchoring portion received in the profiled frame element; a film-engaging portion including a pointed part which is arranged to be deflected when an X-ray film is introduced between said surface and said film-engaging portion and to hold said film against said illuminated surface by friction, the engaging portion supported so that it forms substantially a right angle with the anchoring portion; hinge means connecting the anchoring portion and the engaging portion to facilitate deflection of the engaging portion when the film is mounted, said hinge means including a rounded, smooth bridging portion between the anchoring portion and the engaging portion; said illuminated surface having a recess opposite the pointed part of the engaging portion; the distance between the illuminated surface and the surface of the profiled frame element abutting the anchoring portion being such that when the engaging portion swings back under the frictional engagement of its pointed part against the X-ray film the engaging portion is deflected away from said illuminated surface, resulting in an increase in the elastic abutment pressure exerted against the X-ray film.

6. A fixing means according to claim 1, wherein a horizontal part of the profiled frame element is provided with a longitudinally extending slot to receive the end part of the anchoring portion of the fixing means.

7. A fixing means according to claim 1, wherein the resilient member comprises a continuous, extruded strip.

* * * * *